United States Patent [19]
Yamabe

[11] Patent Number: 5,613,385
[45] Date of Patent: Mar. 25, 1997

[54] VEHICLE DETENTION DEVICE

[75] Inventor: Hideyasu Yamabe, Osaka, Japan

[73] Assignee: Atras Auto Co., Ltd., Osaka-fu, Japan

[21] Appl. No.: 201,855

[22] Filed: Feb. 25, 1994

[30] Foreign Application Priority Data

| May 27, 1993 | [JP] | Japan | 5-124573 |
| Jun. 30, 1993 | [JP] | Japan | 5-160520 |

[51] Int. Cl.⁶ .................................. B60R 25/00
[52] U.S. Cl. ........................... 70/226; 70/14; 70/18; 188/32
[58] Field of Search .............. 70/14, 225, 226, 70/18, 19, 233–235, 237, 238, 259; 188/32

[56] References Cited

U.S. PATENT DOCUMENTS

| 3,537,548 | 11/1970 | Jeppessen | 70/18 X |
| 3,687,238 | 8/1972 | Carpenter | 70/18 X |
| 3,695,071 | 10/1972 | West | 70/18 X |
| 3,845,643 | 11/1974 | Barrett | 70/226 X |
| 4,723,426 | 2/1988 | Beaudoin | 70/226 X |
| 4,804,070 | 2/1989 | Bohler | 70/226 X |
| 5,134,868 | 8/1992 | Bethards | 70/226 X |
| 5,176,013 | 1/1993 | Kutauskas | 70/226 X |
| 5,271,636 | 12/1993 | Mohrman et al. | 70/226 X |
| 5,333,477 | 8/1994 | Davis | 70/226 |

FOREIGN PATENT DOCUMENTS

| 1072720 | 8/1991 | Australia | 70/226 |
| 0168067 | 1/1986 | European Pat. Off. | |
| 1026347 | 4/1953 | France | 70/14 |
| 62-114856 | 7/1987 | Japan | |
| 4118340 | 4/1992 | Japan | 70/18 |
| 4201652 | 7/1992 | Japan | 70/14 |
| 2112725 | 7/1983 | United Kingdom | |
| 2128949 | 5/1984 | United Kingdom | |
| 2147556 | 5/1985 | United Kingdom | |
| 2152890 | 8/1985 | United Kingdom | |
| 2206552 | 1/1989 | United Kingdom | 70/226 |
| 2244247 | 11/1991 | United Kingdom | |

Primary Examiner—Suzanne L. Dino
Attorney, Agent, or Firm—Lalos & Keegan

[57] ABSTRACT

A vehicle detention device provides a pair of stopper blocks, where one of the stopper blocks moves on a guide shaft relative to the other stopper block secured to the guide shaft. A locking device is provided in order to prevent the movable stopper block from shifting away from a tire so that both the stationary and movable stopper blocks remain in contact with the tire at both sides of ground contact point to prevent rotation of the wheel with the tire mounted thereon. Using a pair of chains, the wheel is secured and placed under detention with the stopper blocks closely held in contact with the tire. Since the mechanical components necessary for releasing the tire and wheel are fully concealed by a key-actuated cover unit, no one can readily remove the vehicle detention device from the restrained vehicle without operating a proper key, thus securely detaining the vehicle.

7 Claims, 20 Drawing Sheets

5,613,385

VEHICLE DETENTION DEVICE

FIELD OF THE INVENTION

The present invention relates to a vehicle detention device capable of securely effectuating detention of a wheel of a vehicle illegally parked and preventing a vehicle from moving by securely restraining a wheel so that the vehicle can be prevented from being stolen.

BACKGROUND OF THE INVENTION

For example, the Japanese Laid-Open Unexamined Utility Model Application No. 62-114856 (1987) discloses a vehicle detention device. The vehicle detention device disclosed in this Utility Model Publication comprises a pair of wheel stopper blocks respectively coming into contact with an external circumferential surface of a tire of a wheel, a connecting member connecting the wheel stopper blocks by extending along an external circumferential surface of the wheel in order to shield an air-injecting hole of the tire and juncture of the tire and the wheel, and a clamping member secured to a shielding member to permit the wheel stopper blocks to clamp the wheel by way of sandwiching it between them.

However, the vehicle detention device disclosed in the above-cited published application secures the upper part of the wheel merely by means of the connecting member extending itself along the external circumferential surface of the tire. This in turn allows the upper part of the connecting member to easily be removed towards the surface side of the wheel, and yet, permits the vehicle detention device to easily be disengaged from the wheel merely by lifting the wheel with a jack, thus failing to properly secure the vehicle.

SUMMARY OF THE INVENTION

Therefore, the object of the invention is to fully solve the above problem by providing a novel vehicle detention device at inexpensive cost, which features simple structure and is capable of preventing easy removal from a wheel without unlocking a key, and yet, be easily secured to the wheel.

To achieve the above object, the novel vehicle detention device according to the invention comprises the following:

(1) a stopper block secured to a guide shaft; another stopper block movable through long and short distances along the guide shaft against the former stopper block; a locking means which prevents the former stopper block from shifting in the direction apart from a tire such that both the former and latter stopper blocks remain in contact with the tire at both sides of a ground contact point against the rotating direction of the wheel; a pair of lengthy chains secured to the former and latter stopper blocks, which are extended from the inside to the outside of the wheel forming an X-shape in which both the former and latter stopper blocks remain in contact with the tire in order to fasten and restrain the wheel; and a cover unit provided with a locking key, which fully conceals the mechanical components for releasing the wheel detained by the fastened chains;

(2) a stopper block secured to an end of a horizontally extended cylindrical body; another stopper block secured to an end of a slidable shaft and having the other end being extensible and retractable from and into the other end of the cylindrical body; a locking means which prevents the latter stopper block from shifting in the direction apart from the tire whereby both the former and latter stopper blocks remain in contact with the tire at both sides of ground contact point against the rotating direction of the wheel; a pair of chains secured to the former and latter stopper blocks, which are extended from the inside to the outside of the wheel forming an X-shape in which both the former and latter stopper blocks remain in contact with the tire in order to fasten and restrain the wheel; and a cover unit provided with a locking key, which fully conceals the mechanical components for releasing the wheel detained by the fastened chains.

According to the structure set forth in the above description (1), a wheel subject to detention is fastened and restrained by a pair of chains in which a pair of stopper blocks are brought into contact with a tire at both sides of a ground contact point against the rotating direction of the wheel, and yet, mechanical components for releasing the wheel are fully concealed by a key-locked cover unit. Therefore, no one can easily remove the inventive vehicle detention device from the restrained wheel without unlocking the key, thus securely detaining the wheel. Furthermore, the vehicle detention device according to the invention is simply structured to enable an operator to easily secure the whole device to a wheel to effectuate detention. Therefore, the invention can provide an improved vehicle detention device at inexpensive cost.

According to the structure set forth in the above description (2), one of a pair of stopper blocks is secured to an end of a cylindrical body, whereas the other stopper block is secured to an end of a slidable shaft having the other end being extensible and retractable from and into the other end of the cylindrical body. Owing to this structural arrangement, neither the cylindrical body nor the slidable shaft externally protrude from a pair of stopper blocks. For example, even when a wheel of a parked vehicle having front tires being turned at an angle to the vehicle is restrained, pedestrians will not be impeded by the cylinder body or slidable shaft.

DESCRIPTION OF THE PREFERRED EMBODIMENTS

Figure 1:
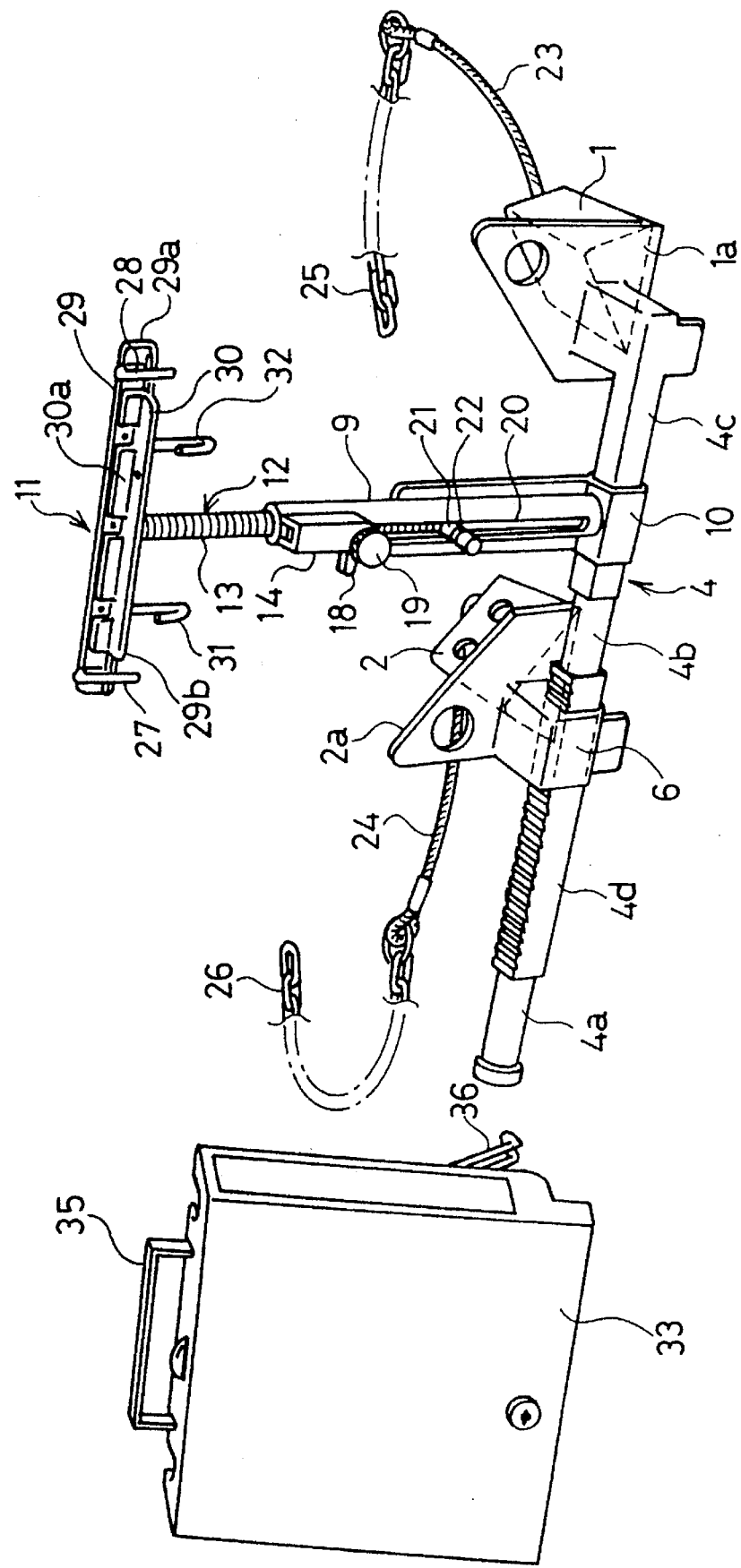
FIG. 1 is an overall perspective view of the vehicle detention device according to the first embodiment of the invention.
Figure 2:
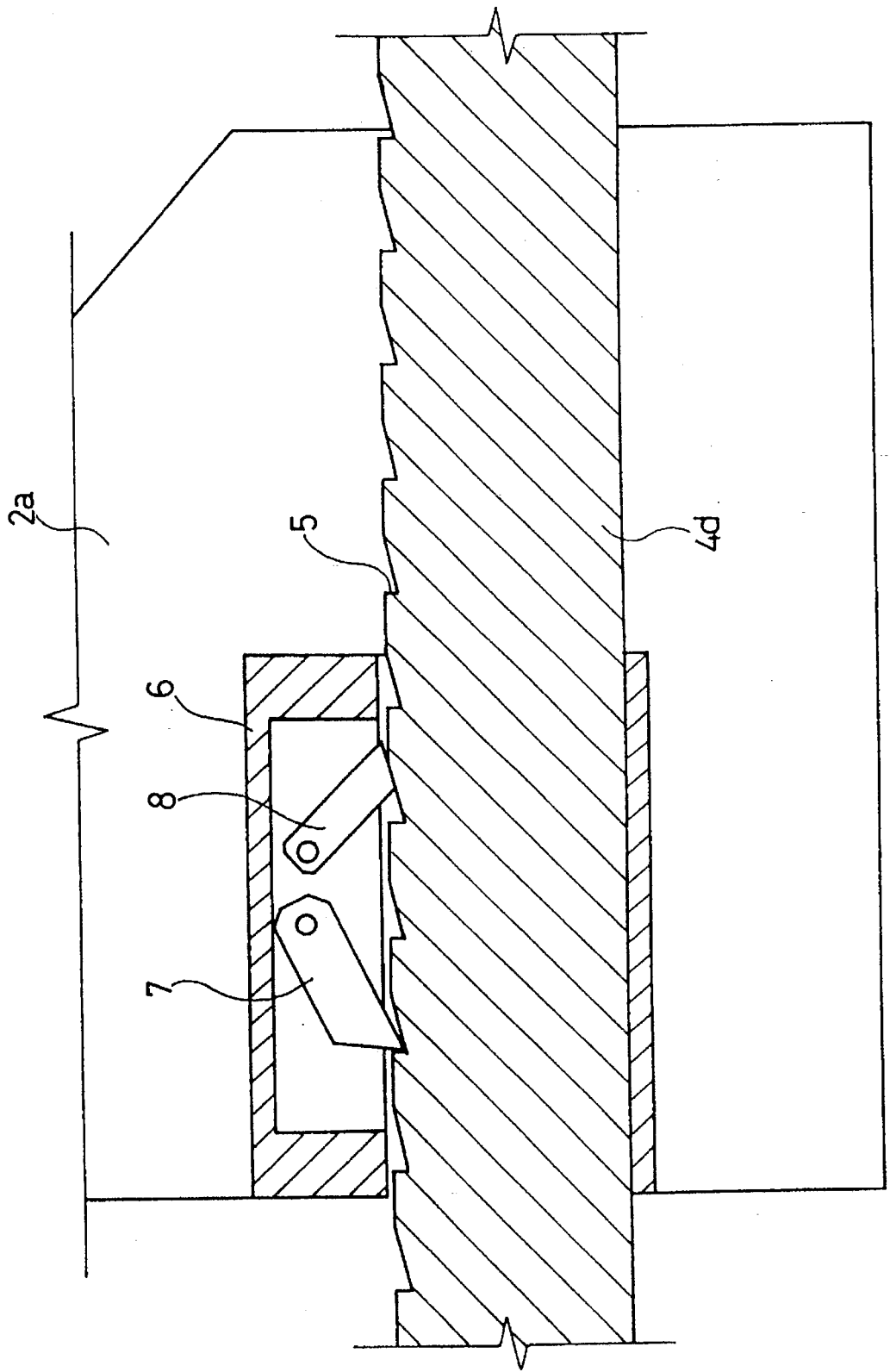
FIG. 2 is a cross-sectional view representing the relationship between a guide cylinder and a locking claw provided inside of a casing.
Figure 3:
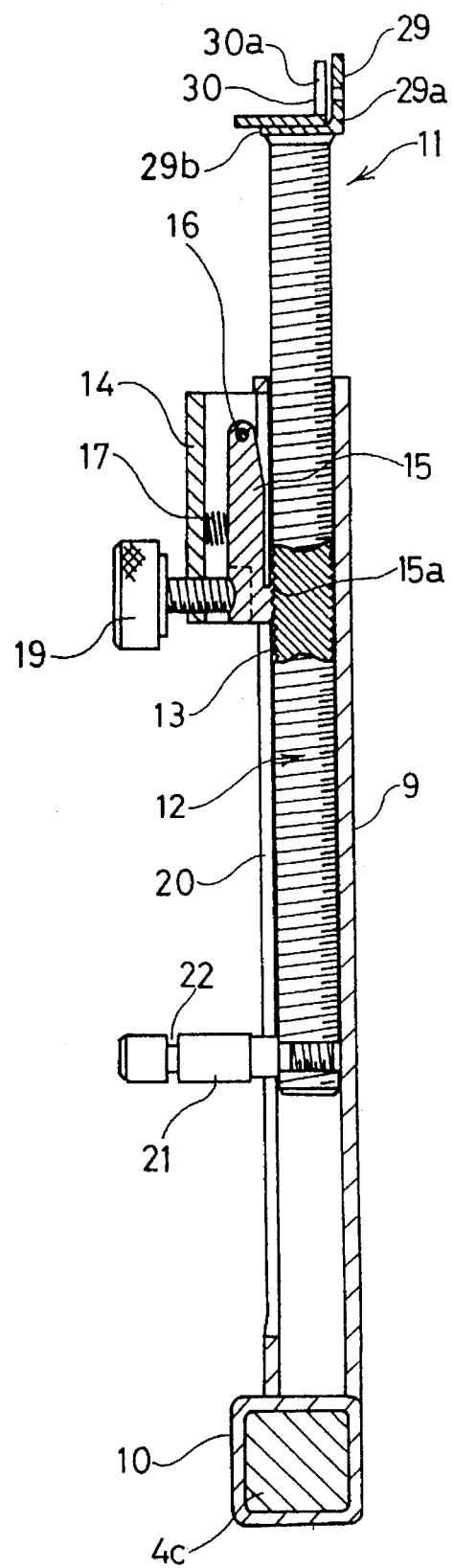
FIG. 3 is a detailed cross-sectional view of a shaft and a strut of an elevating body.
Figure 4:
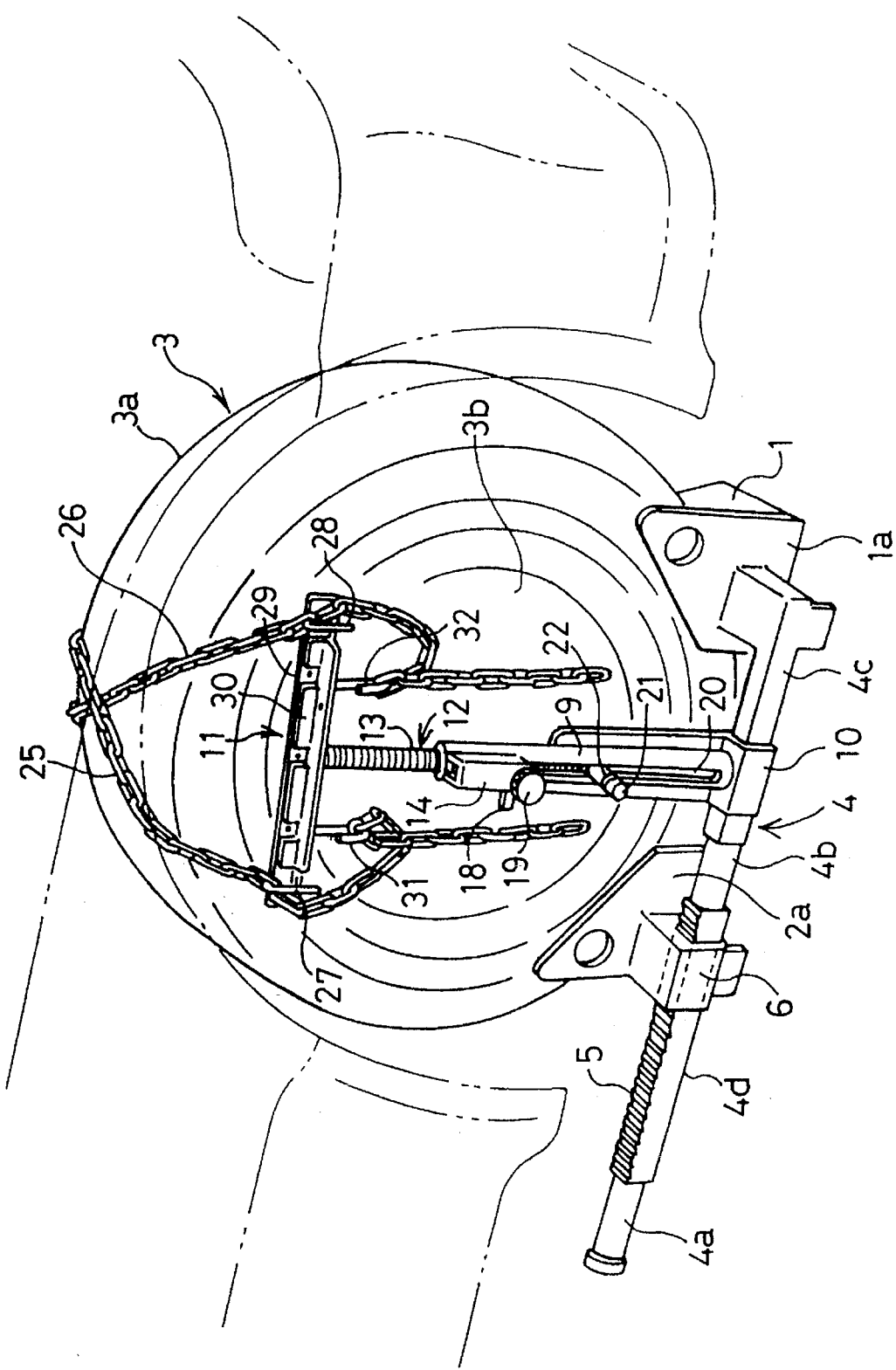
FIG. 4 is an outside perspective view of the vehicle detention device according to the first embodiment of the invention when being secured to a wheel.
Figure 5:
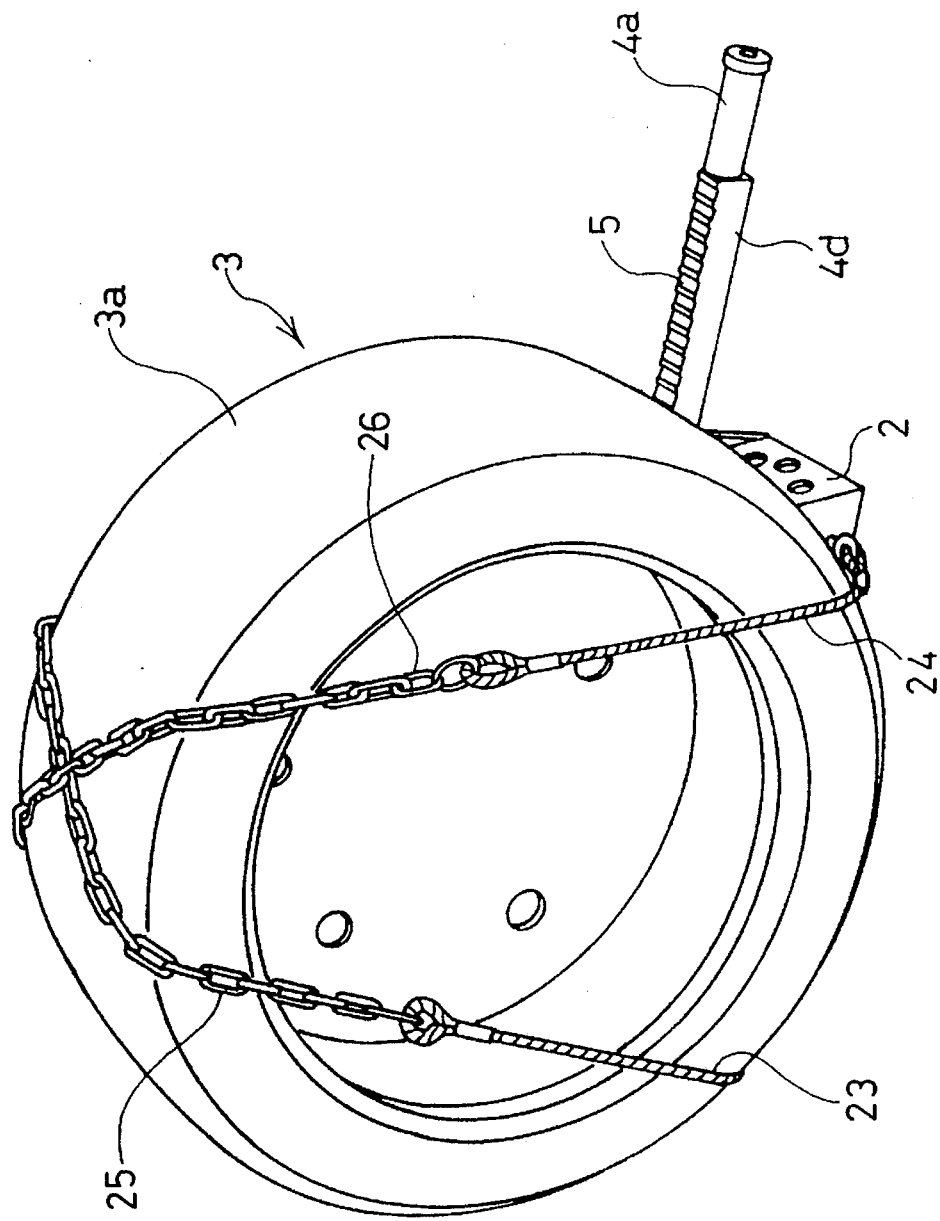
FIG. 5 is an inside perspective view of the vehicle detention device according to the first embodiment of the invention when being secured to a wheel.

FIGS. 1 through 8 show the principal elements of the vehicle detention device according to the first embodiment of the invention, in which the reference numerals 1 and 2 respectively designate a pair of wedge-like stopper blocks which jointly inhibit a wheel 3 from rotatively moving in the forward and backward directions by coming into contact with a tire 3a of the wheel 3 at both sides of a ground contact point. The stopper block 2 is so arranged that it can shift by long and short distances relative to the other stopper block 1. To effectuate this structural arrangement, the stopper block 1 is secured to an end of a horizontally extended guide shaft 4, whereas the other stopper block 2 is movable along the longitudinal direction of the guide shaft 4 and subject to be locked in contact with the tire 3a.

More particularly, the guide shaft 4 has a longitudinal end 4a and a center member 4b each having circular cross-section, whereas the other longitudinal members 4c and 4d are of a square cross-section. Multistep teeth 5 are formed in the longitudinal direction of the guide shaft 4 at equal pitches on the top surface of the square-sectional member 4d between the longitudinal end 4a and the center member 4b. A casing 6 integrated with the stopper block 2 envelops part of the square-sectional member 4d. The casing 6 accommodates a locking claw 7 engageable with the multistep teeth 5. The locking claw 7 climbs over the multistep teeth 5 when the stopper block 2 shifts in the direction closer to the stopper block 1 and comes into engagement with the multistep teeth 5 when the stopper block 2 shifts in the direction away from the stopper block 1. The casing 6 also accommodates an unlocking preventive member 8 which prevents the locking claw 7 from being disengaged from the multistep 5, e.g. by inserting a thin ruler or the like via the clearance between the square-sectional member 4d and the casing 6.

In order to shift the stopper block 2 towards the longitudinal end 4a of the circular-sectional portion of the guide shaft 4, initially, while the stopper blocks 1 and 2 are apart from the wheel 3, the casing 6 is first shifted to the circular-sectional center member 4b in conjunction with the stopper block 2. Next, the casing 6 is rotated by 90 degrees around the guide shaft 4 in conjunction with the stopper block 2 before positioning the locking claw 7 onto part of the surface of the guide shaft 4 devoid of the multistep teeth 5. Then, while in this position, the casing 6 is shifted towards the circular-sectional longitudinal end 4a in conjunction with the stopper block 2. By turning the casing 6 together with the stopper block 2 shifted to the circular-sectional longitudinal end 4a around the guide shaft 4 and then by positioning the locking claw 7 onto the surface provided with the multistep teeth 5, the stopper block 2 can be moved in the direction of the stopper block 1 to sandwich the wheel 3 therebetween.

The stopper blocks 1 and 2 are respectively provided with a plate body 1a and a plate body 2a that come into contact with external lateral surface of the tire 3a. The guide shaft 4 and the casing 6 enveloping part of the square-sectional member 4d of the guide shaft 4 are respectively secured to external surfaces of the plate bodies 1a and 2a.

A cylindrical strut 9 is provided outside of the square-sectional member 4c between the longitudinal end of the guide shaft 4 and the circular-sectional center member 4b. A rectangular member 10 is coupled to the bottom of the cylindrical strut 9 and is movable in the longitudinal direction of the guide shaft 4. A shaft 12 is vertically inserted in the cylindrical strut 9 and supports an elevating body 11 that together form a T-shape. Multistep teeth 13 are formed on an external surface of the downwardly extended shaft 12 along the longitudinal direction at equal pitches. A locking claw 15 provided inside of a casing 14, which is secured to the upper end of the cylindrical strut 9, comes into engagement with the multistep teeth 13 so that the elevating body 11 can be positioned at an optional height. More particularly, a tip portion of the locking claw 15 is supported at an upper portion inside of the casing 14 via a horizontal pin 16, whereas a bottom claw 15a is biased in the direction to be engaged with the multistep teeth 13 by means of a spring 17. A lever 18 externally projects from the casing 14 and is integrated with the locking claw 15. The claw 15a at the bottom of the locking claw 15 is disengaged from the multistep teeth 13 by pulling the lever 18 away from shaft 12 in opposition to the force of the spring 17. In order to fix the claw 15a at the bottom of the locking claw 15 in engagement with the multistep teeth 13, a fastening member 19 is provided with a tip inserted in the casing 14 which forces the bottom edge of the locking claw 15 in the direction of the multistep teeth 13. An aperture 20 is formed in the vertical direction of the cylindrical strut 9. An engaging shaft 21 is inserted in the bottom end of the shaft 12. An engaging groove 22 of the engaging shaft 21, which projects from the aperture 20, enables a key-provided rotary hook of a cover unit to come into engagement with the engaging groove 22 as will be described hereinafter. A pair of wires 23 and 24 are respectively secured to the interior of the stopper blocks 1 and 2 by way of a connection on one end. The other ends of the wires 23 and 24 are respectively connected to ends of a pair of chains 25 and 26. The wires 23 and 24 each have a specific length sufficient to encompass a bottom end of the tire 3a of the wheel 3 between the plate bodies 1a and 2a such that the tire 3a is secured at both sides of ground contact point against rotation of the wheel 3 by means of the stopper blocks 1 and 2. The chains 25 and 26 connected to the other ends of the wires 23 and 24 are extended from the tip end of the chains to the external side of the tire 3a. The other ends of the chains 25 and 26 are respectively caught by a pair of hooks 27 and 28 provided on the top ends of the elevating body 11, which has a T-shape in the front view. More particularly, the top section of the elevating body 11 consists of an L-shaped sectional, horizontally extended plate 29 being orthogonal to the shaft 12 and another L-shaped, horizontally extended plate 30 secured to plate 29 and having a plate member 30*a* which is positioned next to the plate member 29*a* across a clearance. The plate member 30*a* extends vertically as does facing plate member 29*a*. A pair of hooks 27 and 28 are provided on the external surface at both ends of the vertical plate member 29*a*. A pair of hooks 31 and 32 are secured to the bottom surface of a horizontally extending plate member 29*b*. Surplus portions of the other ends of the chains 25 and 26 are hung on the hooks 31 and 32, respectively.

Figure 6:
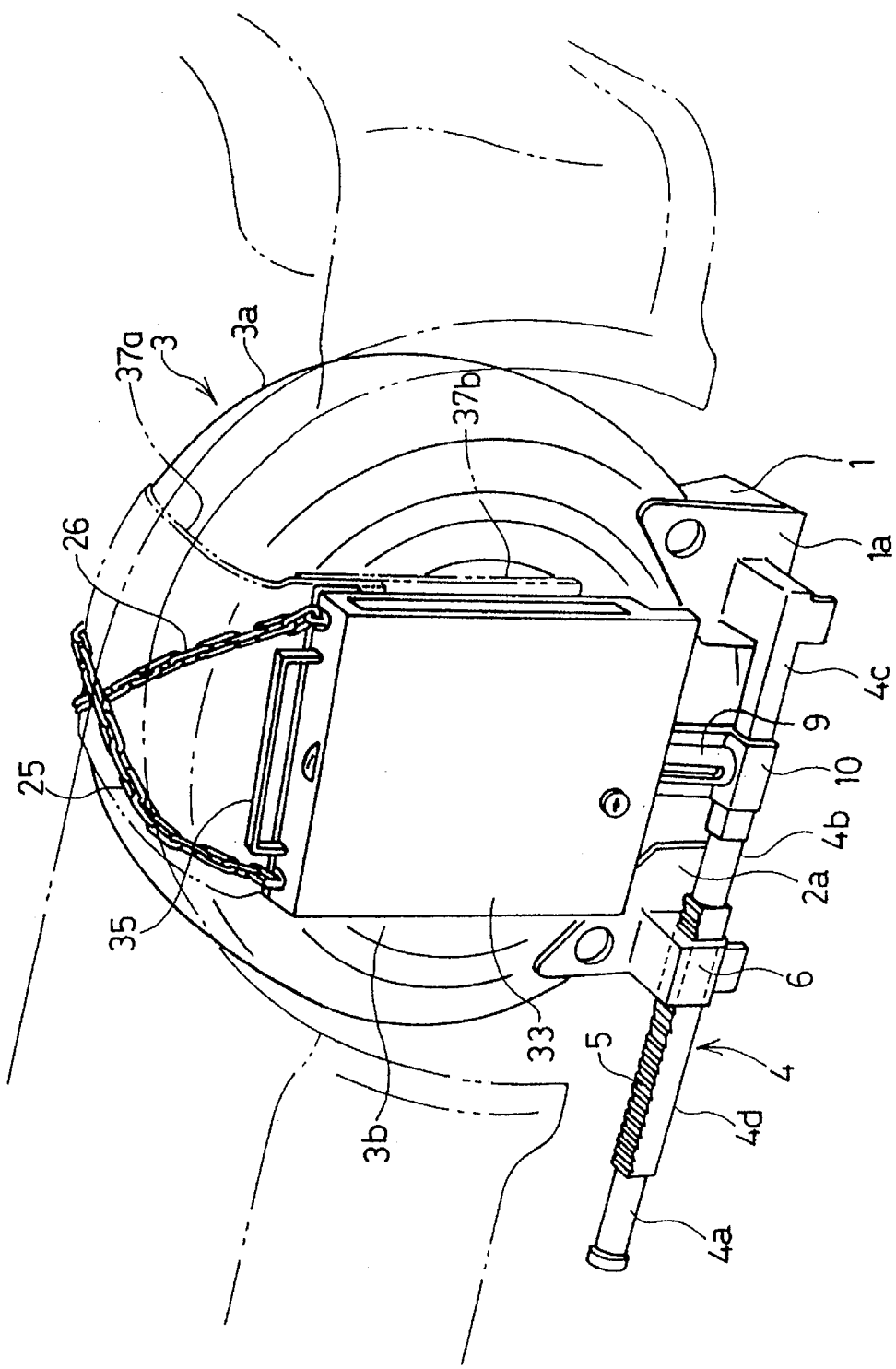
FIG. 6 is an outside view of the vehicle detention device according to the invention after being completely secured to a wheel.
Figure 7:
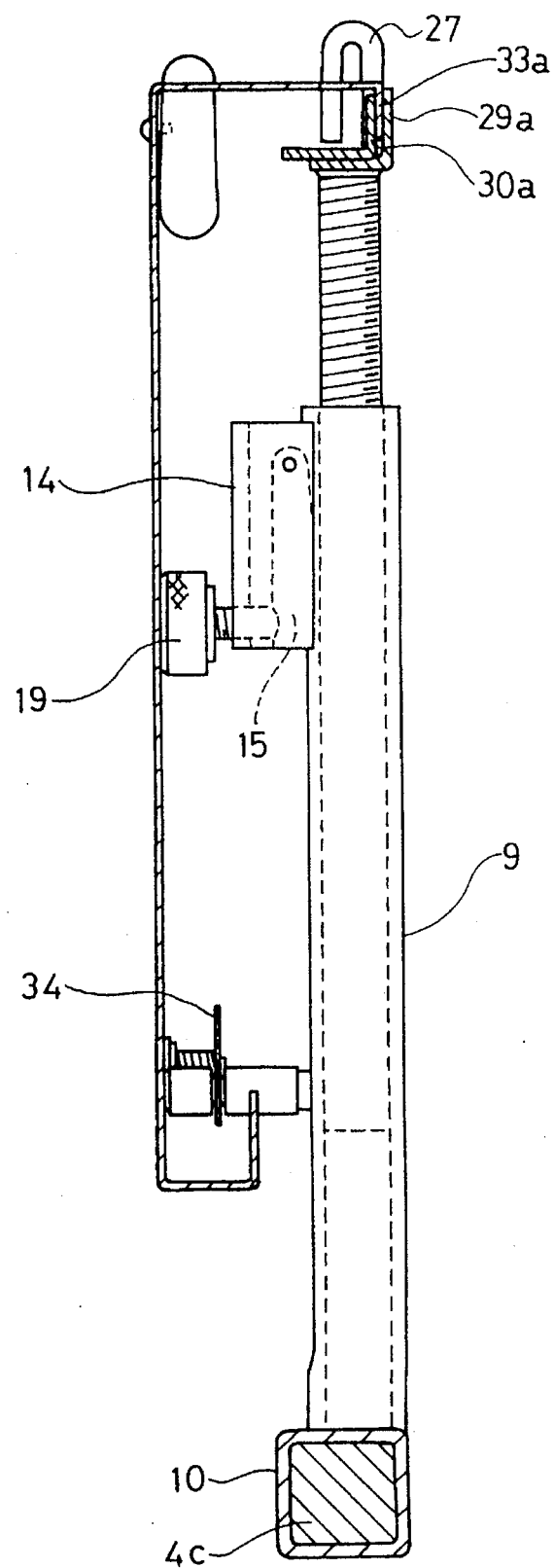
FIG. 7 is a cross-sectional view of mechanical components for securing a cover.
Figure 8:
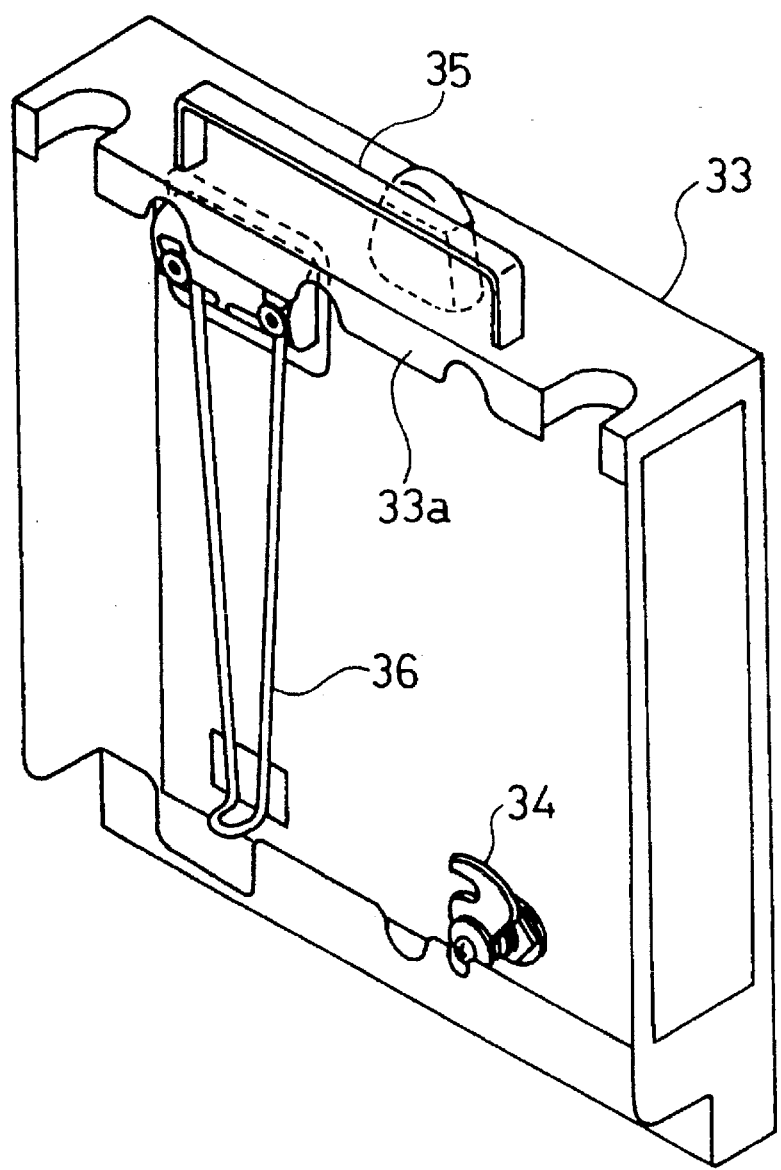
FIG. 8 is an internal perspective view of a cover unit.

The reference numeral 33 shown in FIGS. 1, 6, and 8 designates a cover unit for concealing the above-described mechanism. The cover unit extends from the bottom side of the cylindrical strut 9 to the top end of the elevating body 11. A flange member 33*a* provided inside of the top section of the cover unit 33 comes into engagement with the clearance between the plate member 29*a* and the plate member 30*a* from the top side. A rotary hook 34 engageable with the engaging groove 22 of the engaging shaft 21 is provided inside of the cover unit 33. The rotary hook 34 is operated by a locking key inserted from the exterior of the cover unit 33. The reference numeral 35 designates a handle connected to the top surface of the cover unit 33. The reference numeral 36 designates a stand unit for erecting the cover unit 33 before being secured to the fundamental components of the vehicle detention device.

A practical method of effectuating detention of a wheel of a vehicle using the vehicle detention device of the present invention in accordance with the first embodiment is described below.

Initially, a pair of wedge-like stopper blocks 1 and 2 integrated with a guide shaft 4 are brought to positions close to a wheel 3. Next, the stopper block 2 is shifted along the guide shaft 4 in the direction of the stopper block 1. Next, the stopper blocks 1 and 2 are brought into contact with a tire 3*a* at both sides of ground contact point thereby preventing rotation of the wheel 3. When this arrangement is complete, a cylindrical strut 9 is positioned at the center point between the stopper blocks 1 and 2, in other words, at the center of the wheel 3. Next, using a pair of wires 23 and 24, the bottom edge of the tire 3*a* is externally and internally sandwiched between a plate 1*a* and a plate 2*a* of the stopper blocks 1 and 2. Then, a pair of chains 25 and 26 are connected to the other ends of the wires 23 and 24 and are extended over the exterior of the wheel 3 by way of crossing the chains 25 and 26 in an X-shape at the top end of the tire 3*a*. The other ends of the chains 25 and 26 are hung on a pair of hooks 27 and 28 connected to the tip ends of an elevating body 11. While the above operation is underway, the fastening force of a fastening member 19 is reduced to position the elevating body 11 as high as possible against the strut 9 so that the other ends of the chains 25 and 26 can easily be hung on the hooks 27 and 28. Next, the elevating body 11 is lowered in order that the wheel 3 can be tightly bound with the wires 23 and 24 in association with the chains 25 and 26. As a result of fastening by the fastening member 19, a claw member 15*a* at the bottom end of a locking claw 15 is closely engaged with multistep teeth 13 of a shaft 12. Next, surplus portions of the chains 25 and 26 are hung on a pair of hooks 31 and 32. While in this condition, mechanical components ranging from the bottom portion of the strut 9 to the top of the elevating body 11 are fully concealed by externally securing a cover unit 33 over them. Finally, by externally operating a locking key provided on the cover unit 33, a rotary hook 34 is engaged with an engaging groove 22 of an engaging shaft 21.

As shown in FIG. 6, it is also permissible for an operator to provide a pair of shielding sheets 37A and 37B made from vinyl or the like (designated by double-dotted chain lines) on the top end of the elevating body 11 in order to prevent the tire 3*a* and the wheel 3*b* from incurring unwanted damage. Furthermore, in order to more securely effect detention of the wheel 3, it is optionally possible for an operator to bind the crossing members of the chains 25 and 26 at the top of the tire 3*a* with a locking key.

The wheel detained by the vehicle detention device of the present invention can be released by reversing the steps for restraining the wheel 3 thus far described.

According to the first embodiment of the invention, using a pair of chains 25 and 26, a 3 is fastened and restrained by a pair of stopper blocks 1 and 2 that are brought into contact with the tire 3*a* at both sides of ground contact point thereby preventing rotation of the wheel 3. The fundamental components for releasing the wheel 3 are fully concealed by a key-provided cover unit 33. As a consequence, no one can readily remove the vehicle detention device from the wheel 3 without operating a proper key, and therefore, the vehicle can securely be maintained under detention. Furthermore, the vehicle detention device according to the first embodiment of the present invention is characterized by a simple and low cost structure to permit an operator to easily secure the device onto a wheel 3 to effect detention of a vehicle.

Referring now to FIGS. 9 through 17, a vehicle detention device according to a second embodiment of the invention is described below. The reference numerals 41 and 42 designate a pair of wedge-like stopper blocks, which come into engagement with a tire 43*a* of a wheel 43 at both sides of a ground contact point to inhibit the wheel 43 from rotating. The stopper block 42 can be shifted apart from the other stopper block 41 by varying distances. To effectuate this structural arrangement, the stopper block 41 is secured to a first end of a horizontally extended cylindrical body 44, whereas the stopper block 42 is secured to an end of a slidable shaft 45 having its other end being capable of freely entering into and moving out of a second end of the cylindrical body 44.

More particularly, except for the circular-sectional end on the part of the stopper block 42, the slidable shaft 45 is of square-sectional form. Multistep teeth 46 are formed on the top surface of a square-sectional member 45*a* in the longitudinal direction at equal pitches. A locking claw 47 is provided inside of and at the other end of the cylindrical body 44. The locking claw 47 climbs over the multistep teeth 46 when the stopper block 42 shifts in the direction closer to the stopper block 41. The locking claw 47 comes into engagement with the multistep teeth 46 when the stopper block 42 shifts in the direction away from the stopper block 41. An unlocking preventive member 48 is provided inside of the other end of the cylindrical body 44. The unlocking preventive member 48 prevents the locking claw 47 from being disengaged from the multistep teeth 46, e.g. by inserting a thin ruler or the like via the clearance between the square-sectional member 45*a* and the cylindrical body 44.

In order to shift the stopper block 42 in the direction away from the other stopper block 41, initially, while the stopper blocks 41 and 42 are apart from the wheel 43, the slidable shaft 45 is first shifted in conjunction with the stopper block 42 until the slidable shaft 45 is fully inserted in the cylindrical body 44. Then, in conjunction with the stopper block 42, the slidable shaft 45 is turned by 90 degrees inside of the cylindrical body 44 to position the multistep teeth 46 next to a surface of body 44 devoid of the locking claw 47. While in this condition, the slidable shaft 45 is moved in the direction to draw the shaft 45 out of the cylindrical body 44 together with the stopper block 42. The multistep teeth 46 are then positioned next to the surface of body 44 provided with the locking claw 47 by inversely turning the slidable shaft 45 and the stopper block 42 by 90 degrees. The stopper block 42 can then be shifted in the direction towards stopper block 41 to sandwich the wheel 43.

The stopper blocks 41 and 42 are provided with a plate member 41a and a plate member 42a, respectively, which come into contact with an external surface of the tire 43a. External surfaces of the plate members 41a and 42a are secured to an end of the cylindrical body 44 and an end of the slidable shaft 45, respectively.

A cylindrical strut 49 is erected outside of the cylindrical body 44 at a position offset from the center of the cylindrical body 44. The cylindrical strut 49 is reinforced by means of a reinforcing member 50 having bracket-shaped horizontal section. A shaft member 52 of an elevating body 51, which has a T-shape, is inserted in the cylindrical strut 49 from the top side thereof. Multistep teeth 53 are formed on external surface of the shaft member 52 in the longitudinal direction at equal pitches. A locking claw 55 is accommodated in a casing 54 and secured to an upper portion of the cylindrical strut 49 and is engaged with the multistep teeth 53 so that the elevating body 51 can be positioned at an optional height. Claw 55 is secured inside of the casing 54 by means of a horizontal pin 56. A claw member 55a at the bottom end of claw 55 comes into engagement with the multistep teeth 53 when the claw member 55a is biased in the direction towards the multistep teeth 53 by means of a spring 57. A lever 58 is integrally provided with the locking claw 53 and projects from the casing 54. By pulling the lever 58 towards the operator side in opposition to the force of the spring 57, the claw member 55a at the bottom end of the locking claw 55 can be disengaged from the multistep teeth 53. In order to permit the claw member 55a at the bottom end of the locking claw 55 to be fixed in engagement with the multistep teeth 53, a fastening member 59 presses the bottom end of the locking claw 55 against the multistep teeth 53 by means of the tip end thereof inserted in the casing 54. When the fastening member 59 is turned to the right, the fastening condition is achieved. An aperture 60 is formed in the cylindrical strut 49 in the vertical direction. A tip end of an engaging shaft 61 is inserted in the bottom end of strut 49. An engaging groove 62 of the engaging shaft 61 is provided outside of the aperture 60. A key-actuated rotary hook (to be described later on) is engageable with the groove 62.

A pair of wires 63 and 64 are secured to the interior of the stopper blocks 41 and 42, respectively, with first ends of the wires being connected to the interiors of the blocks. The other ends of the wires 63 and 64 are connected to first ends of a pair of chains 65 and 66 respectively. The wires 63 and 64 each have a specific length sufficient to encompass a bottom end of the tire 43a of the wheel 43 between the plate members 41a and 42a such that the tire 43a is secured at both sides of ground contact point against rotation of the wheel 43 by means of the stopper blocks 41 and 42. The chains 65 and 66 connected to the other ends of the wires 63 and 64 are extended from the tip end to the exterior of the tire 43a. The other ends of the chains 65 and 66 are caught by a pair of hooks 67 and 68 provided on the top end of the elevating body 51, which has a T-shape in the front view.

More particularly, the top end of the elevating body 51 consists of an L-shaped sectional, horizontally extended plate 69 being orthogonal to the shaft 52 and another L-shaped sectional, horizontally extended plate 70 secured to plate 69 and having a plate member 70a which is positioned next to the plate 69 across a clearance. The plate member 70a extends vertically as does the external surface 69a of the plate member 69. A pair of hooks 67 and 68 are provided on external surfaces at both ends of the plate member 69 on vertical section 69a of the plate member 69. A pair of hooks 71 and 72 are secured to the bottom surface of a plate member 69a. Surplus portions of ends of the chains 65 and 66 are hung on the hooks 71 and 72, respectively.

Figure 9:
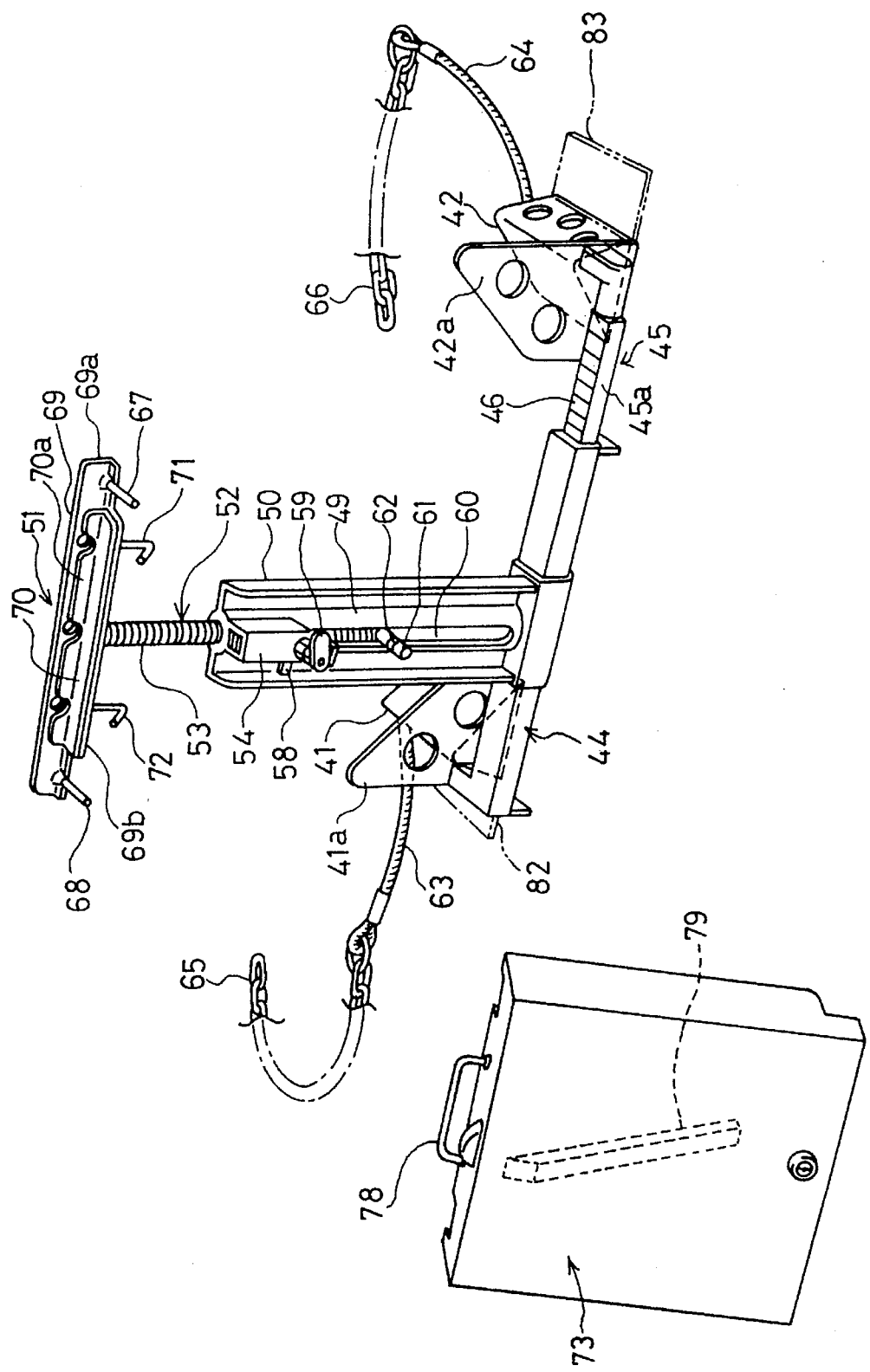
FIG. 9 is an overall perspective view of the vehicle detention device according to the second embodiment of the invention.
Figure 10:
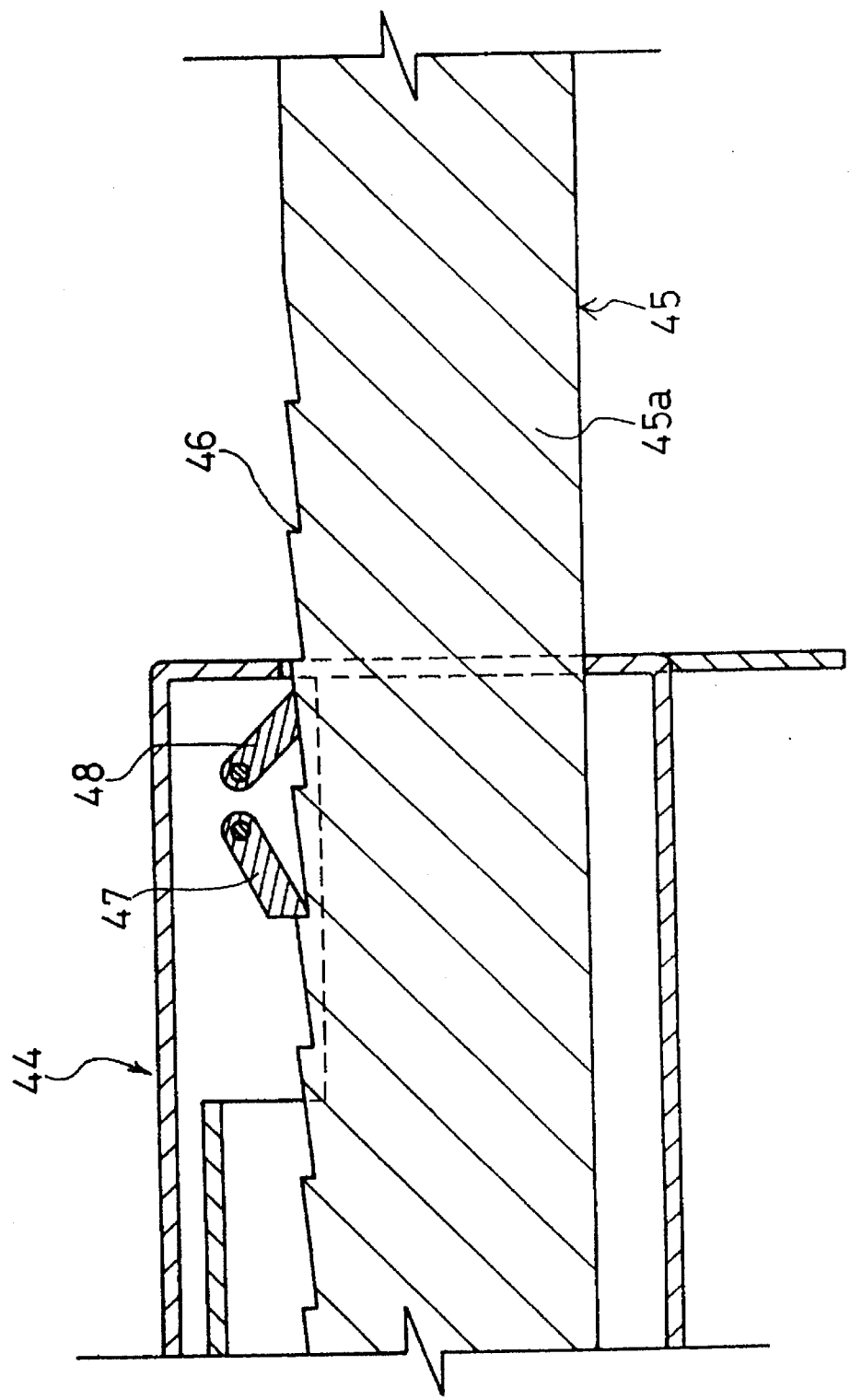
FIG. 10 is a cross-sectional view representing the relationship between a slidable shaft and a locking claw provided inside of a cylindrical body.
Figure 11:
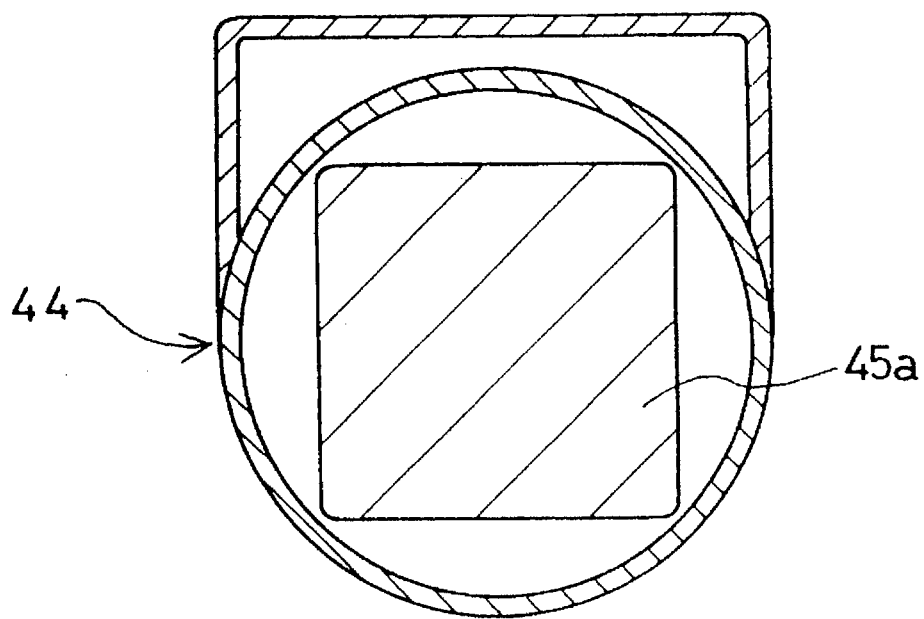
FIG. 11 is a cross-sectional view representing the relationship between the slidable shaft and the cylindrical body.
Figure 12:
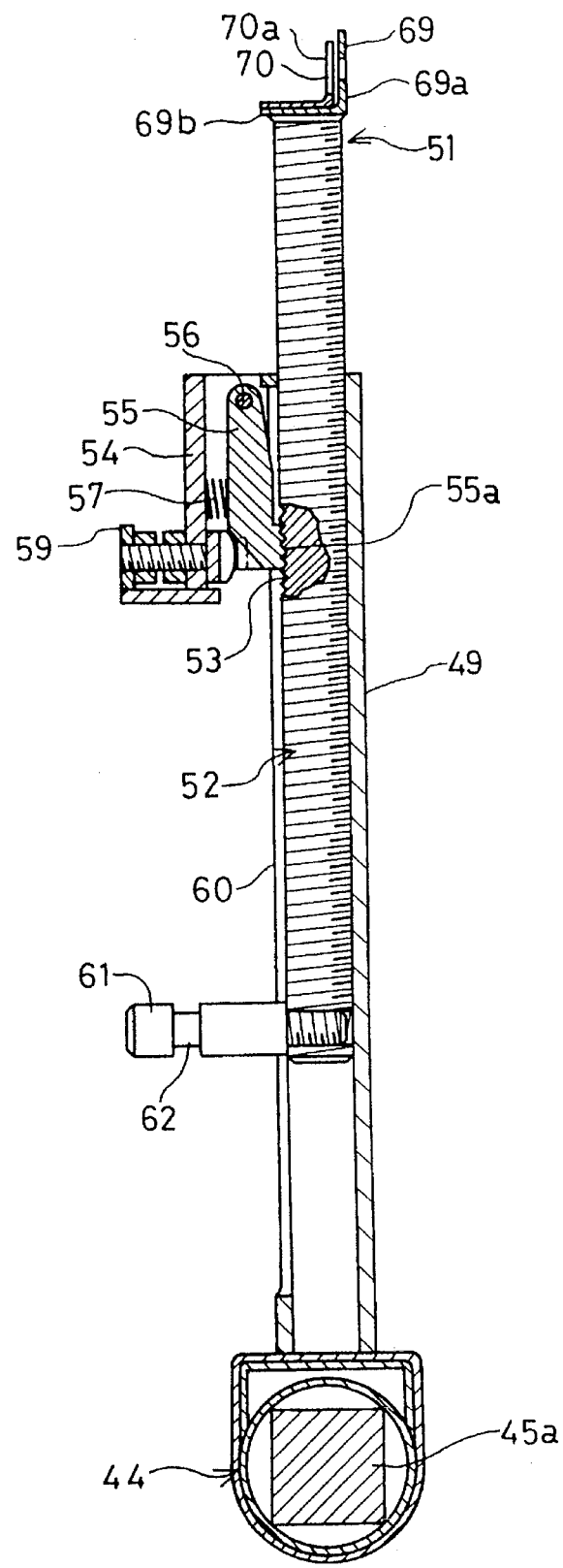
FIG. 12 is a cross-sectional view representing the relationship between a shaft of an elevating body and a strut.
Figure 13:
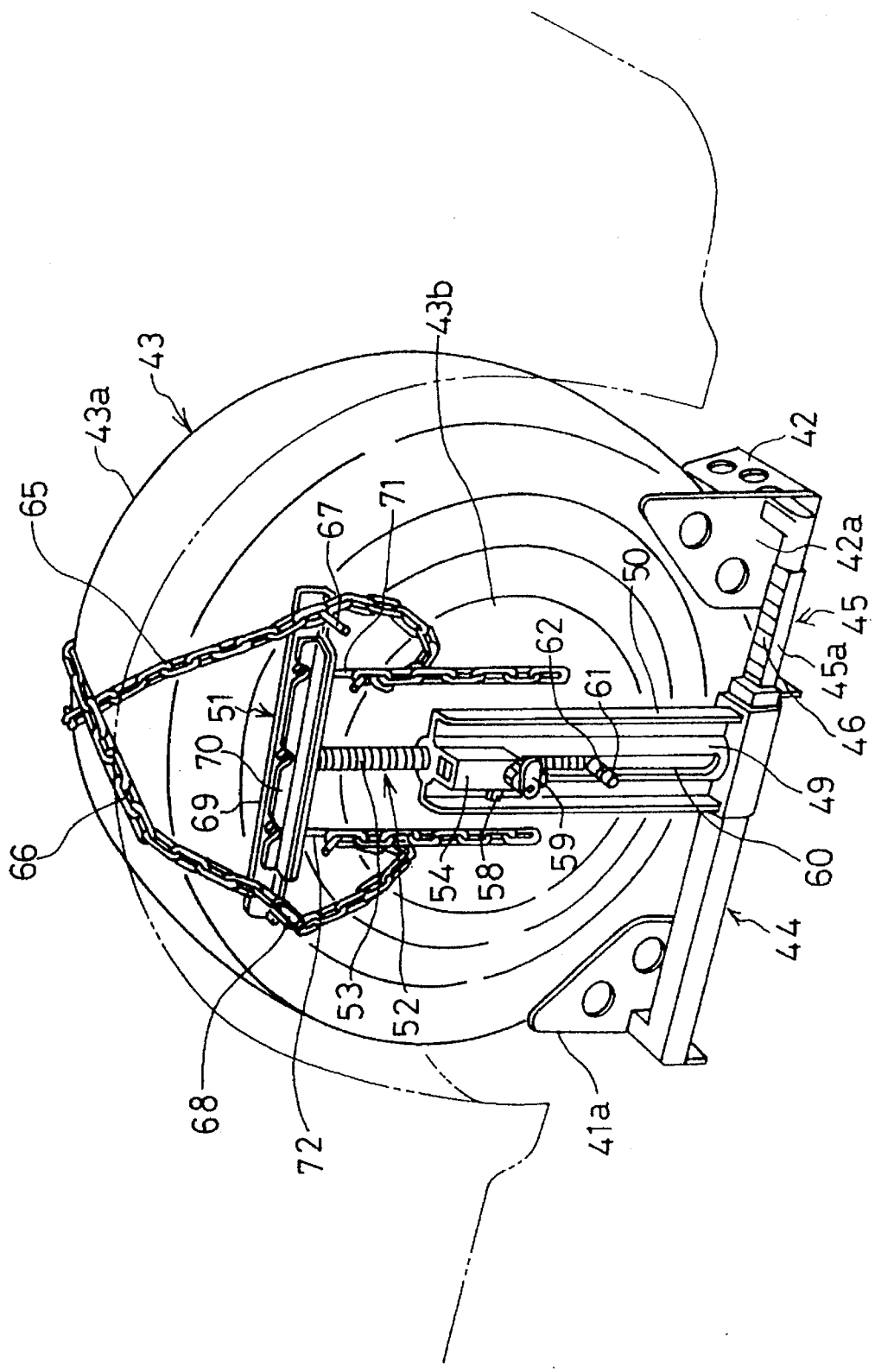
FIG. 13 is an outside perspective view of the vehicle detention device according to the second embodiment of the invention secured to a wheel.
Figure 14:
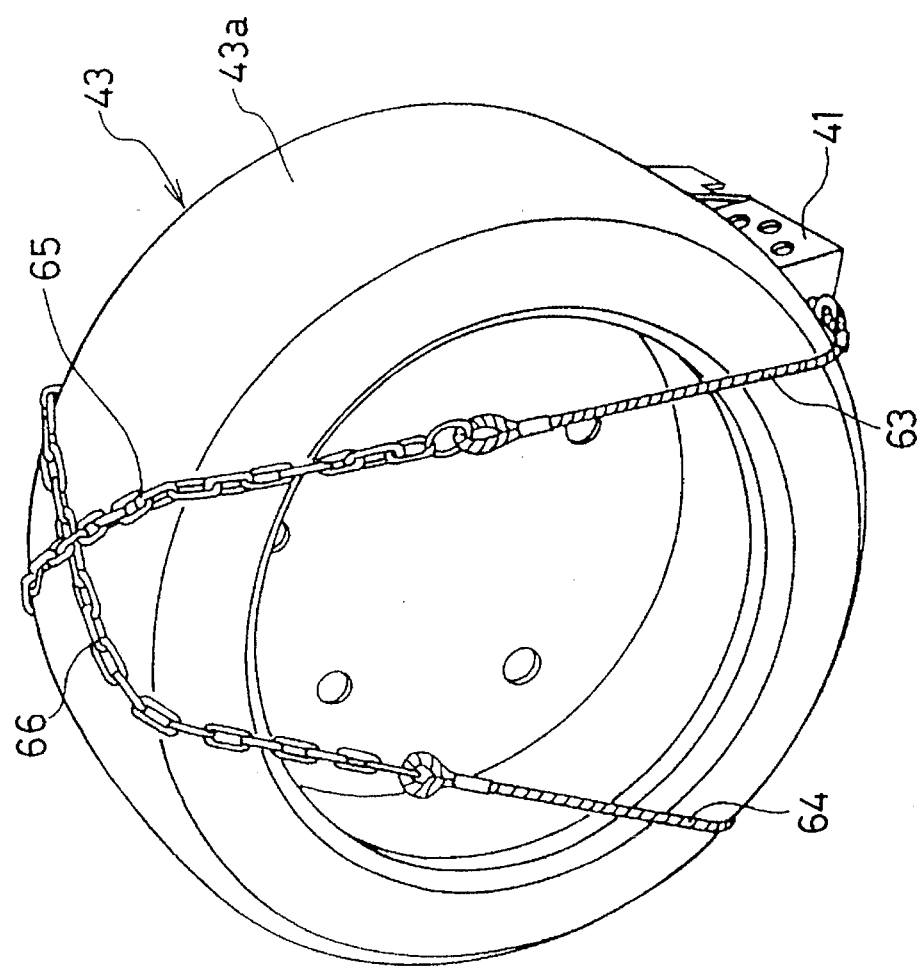
FIG. 14 is an inside perspective view of the vehicle detention device according to the second embodiment of the invention secured to a wheel.
Figure 15:
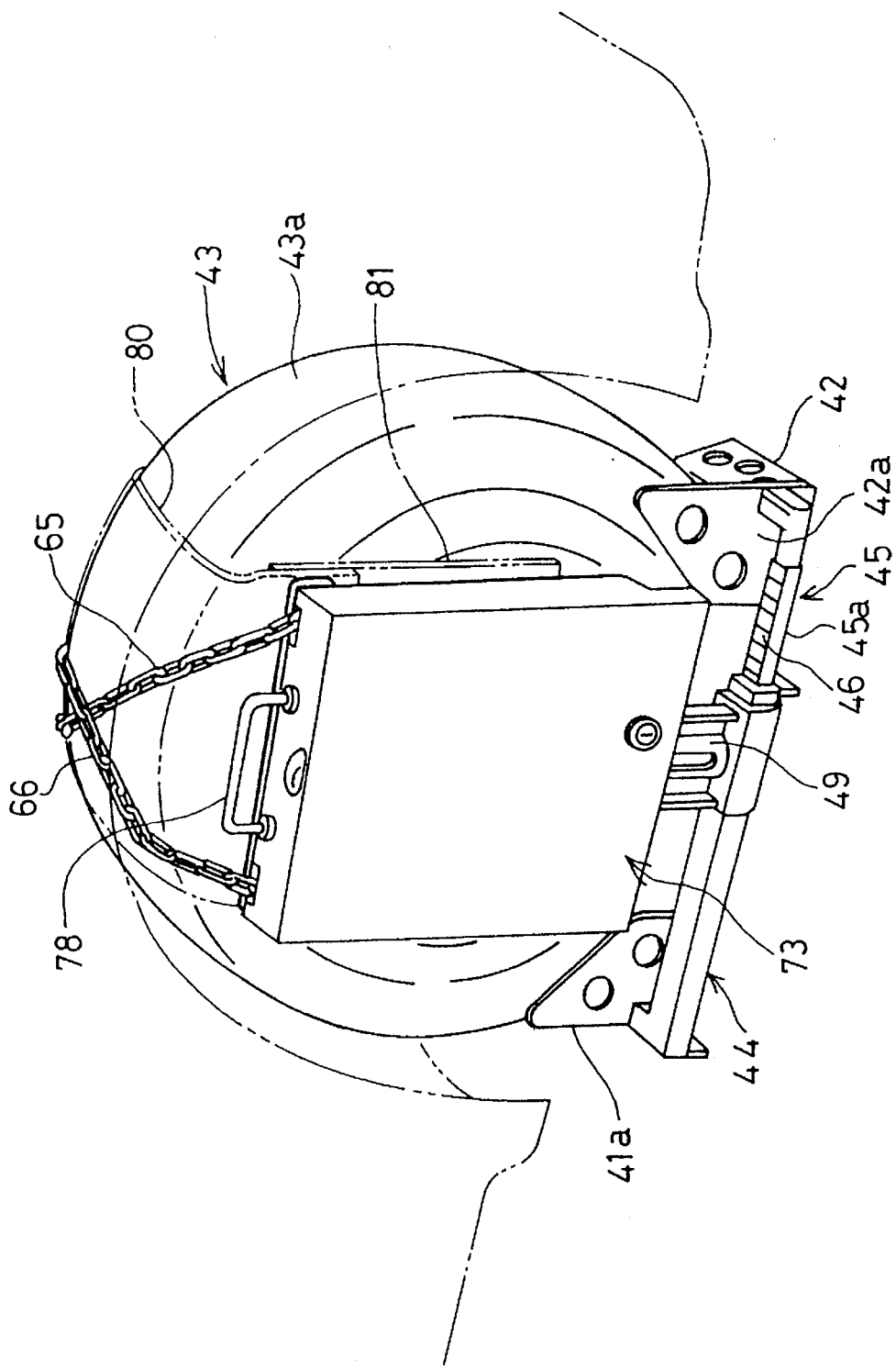
FIG. 15 is an outside perspective view of the vehicle detention device according to the second embodiment of the invention after being completely secured to an objective wheel.
Figure 16:
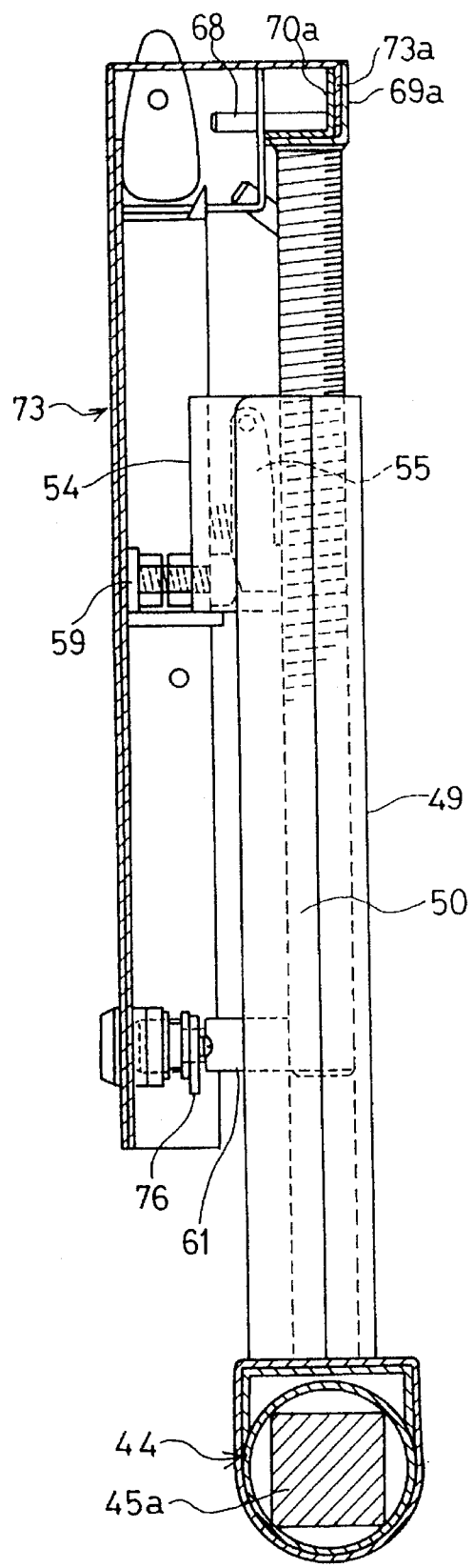
FIG. 16 is a cross-sectional view of cover-fixing components for securing a cover.
Figure 17:
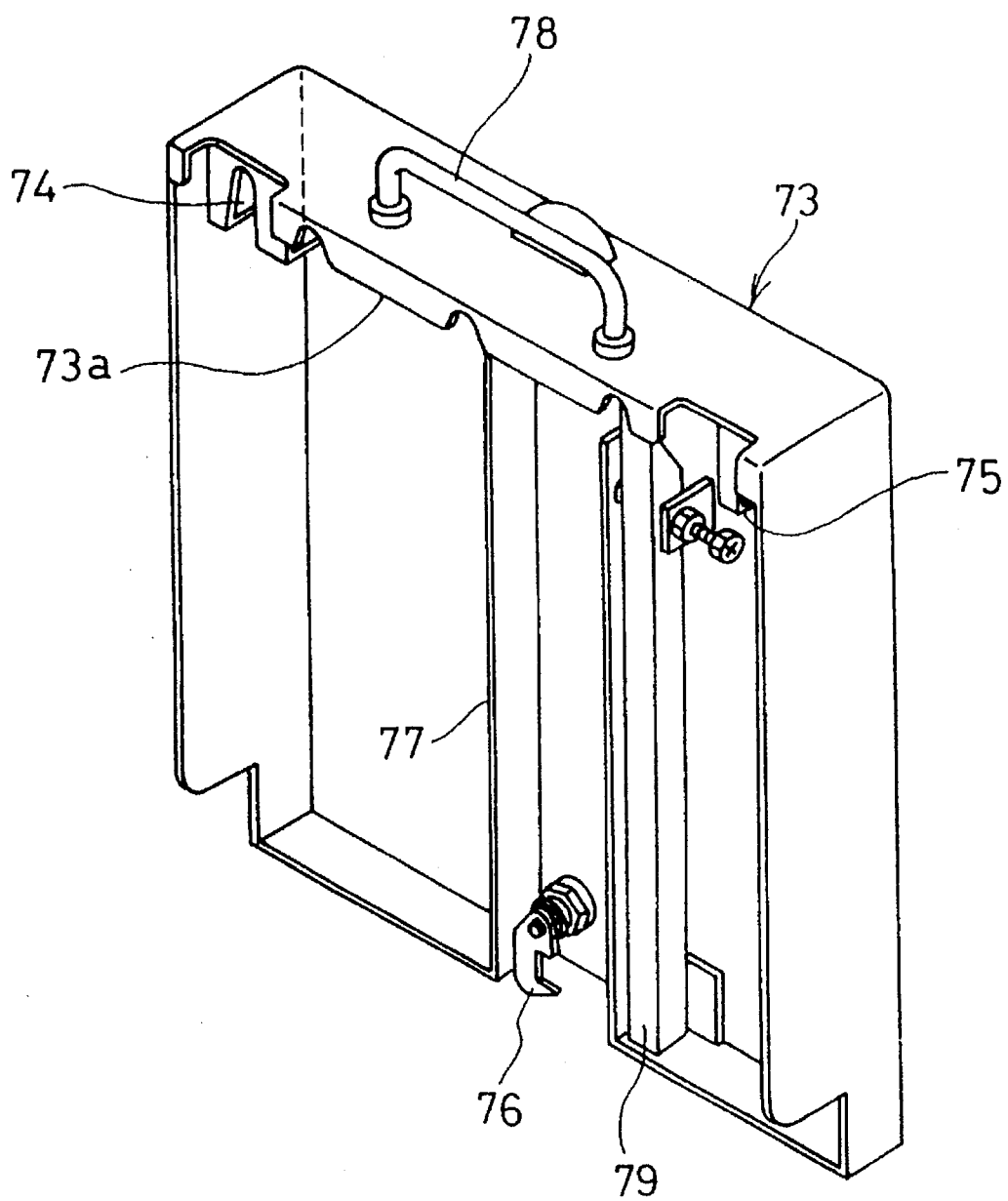
FIG. 17 is an internal perspective view of a cover unit.

The reference numeral 73 shown in FIGS. 9, 15, and 17 designates a cover unit for fully concealing the above-described fundamental components which are located in an area ranging from the bottom side of the cylindrical strut 49 to the top end of the elevating body 51. A flange member 73a provided on the inside of the top end of the cover unit 73 comes into engagement with the clearance between the plate member 69a and the other plate member 70a from the top side. A pair of grooves 74 and 75 are formed at the upper inside edges on both sides of the cover unit 73. The grooves 74 and 75 are engaged with the hooks 67 and 68, respectively, to effect positioning of the cover unit 73 onto the wheel detention mechanism. A rotary hook 76 engageable with the engaging groove 62 of the engaging shaft 61 is provided inside of the bottom end of the cover unit 73 at the center position. The rotary hook 76 is operated by means of a locking key inserted from the exterior of the cover unit 73. The reference numeral 77 designates a pair of plate members provided on the internal surface of the cover unit 73 at the center of its width in order to sandwich the cylindrical strut 49 from both sides when the cover unit 73 is secured to the elevating body 51 and the strut 49. While the fastening member 59 is disengaged from claw member 55a, one of the plate members 77 will come into contact with the fastening member 59 to inhibit attachment of the cover unit 73. The cover unit 73 can properly be secured to the elevating body 51 and the cylindrical strut 49 only when the fastening member 59 is turned to the right to engage claw member 55a. The reference numeral 78 designates a carrying handle secured to the top surface of the cover unit 73. The reference numeral 79 designates a stand unit to erect the cover unit 73 before securing the cover unit 73 to the elevating body 51 and the cylindrical strut 49.

Next, a practical method of effectuating detention of a vehicle by means of the vehicle detention device according to the second embodiment of the invention being characterized by the above structure is described below. Initially, the vehicle detention device is brought to a position very close to the wheel 43. Then, the slidable shaft 45 is inserted into the cylindrical body 44 and the stopper block 42 is shifted in the direction of the other stopper block 41. Next, the stopper blocks 41 and 42 are brought into contact with the tire 43a at both sides of ground contact point to prevent the wheel 43 from rotating. When this condition is met, the strut 49 is positioned on the cylindrical body 44 to a center position between the stopper blocks 41 and 42, in other words, substantially at the center of the wheel 43. While this condition is effected, the bottom end of the tire 43a is internally and externally sandwiched by the stopper blocks 41 and 42 by means of the wires 63 and 64. Then, the chains 65 and 66 connected to the other ends of the wires 63 and 64 are extended over the exterior of the wheel 43 by crossing the chains 65 and 66 in an X-shape at the top end of the tire 43a. Next, the other ends of the chains 65 and 66 are hung on the hooks 67 and 68 provided on the top side of the elevating body 51. At the same time, the elevating body 51 is positioned as high as possible on strut 49 while the fastening member 59 remains disengaged in order that the other ends of the chains 65 and 66 can easily be hung on the hooks 67 and 68. Next, the elevating body 51 is lowered in order that the wheel 43 can be fastened securely by means of the wires 63 and 64 in cooperation with the chains 65 and 66. Next, the fastening member 59 is operated to engage the claw member 55a causing it to come into close engagement with the multistep teeth 53 formed on the shaft member 52. Next, surplus portions of the other ends of the chains 65 and 66 are hung on the hooks 71 and 72. Then, while in this position, mechanical components ranging from the bottom portion of the strut 49 to the top portion of the elevating body 51 are fully concealed by securing the cover unit 73 over them. Finally, the rotary hook 76 is engaged with the engaging groove 62 of the engaging shaft 61 by operating a key from the exterior of the cover unit 73.

As shown in FIG. 15, it is permissible for an operator to provide a pair of shielding sheets made from vinyl or the like (designated by double-dotted chain lines) on the top side of the elevating body 51 so that the tire 43a and the wheel 43b can be prevented from incurring unwanted damage. Furthermore, in order to more securely effectuate detention of the wheel 43, crossing members of the chains 65 and 66 at the top end of the tire 43a may be bound by means of a locking key. Furthermore, as shown in FIG. 9, a pair of externally projecting plates 82 and 83 may be provided on the bottom sides of the stopper blocks 41 and 42. By virtue of these plates 82 and 83 on both sides of the stopper blocks 41 and 42, even when someone attempts to drive the restrained vehicle by starting up the engine thereof while the wheel 43 is still held under detention, road surface can be prevented from incurring unwanted damage otherwise caused by bite of the stopper blocks 41 and 42.

The state of detention of the wheel effected by the vehicle detention device can be released by reversing the steps for restraining the wheel 43.

According to the second embodiment of the invention, the wheel 43 is fastened and restrained by the chains 65 and 66 in cooperation with a pair of stopper blocks 41 and 42 that are brought into contact with the tire 43a at both sides of ground contact point to prevent rotation of the wheel 43. The fundamental components for freeing the state of detention are fully concealed by the cover unit 73 furnished with a key. Therefore, no one can readily remove the vehicle detention device from the restrained wheel 43 without operating a proper key, thus making it possible for the device to securely detain the vehicle. In addition, the vehicle detention device according to the second embodiment of the invention features a simple and low cost structure to enable an operator to readily secure the device onto the wheel 43. The stopper block 41 is secured to an end of the cylindrical body 44, whereas the other stopper block 42 is secured to an end of the slidable shaft 45 having its other end being capable of freely entering into and moving out of the other end of the cylindrical body 44. Owing to this structural arrangement, while the vehicle is still held under detention, neither the cylindrical body 44 nor the slidable shaft 45 protrudes from the stopper blocks 41 and 42. Accordingly, when a parked vehicle is restrained pedestrians are prevented from stumbling over the cylindrical body 44 or the slidable shaft 45 otherwise projecting.

Figure 18:
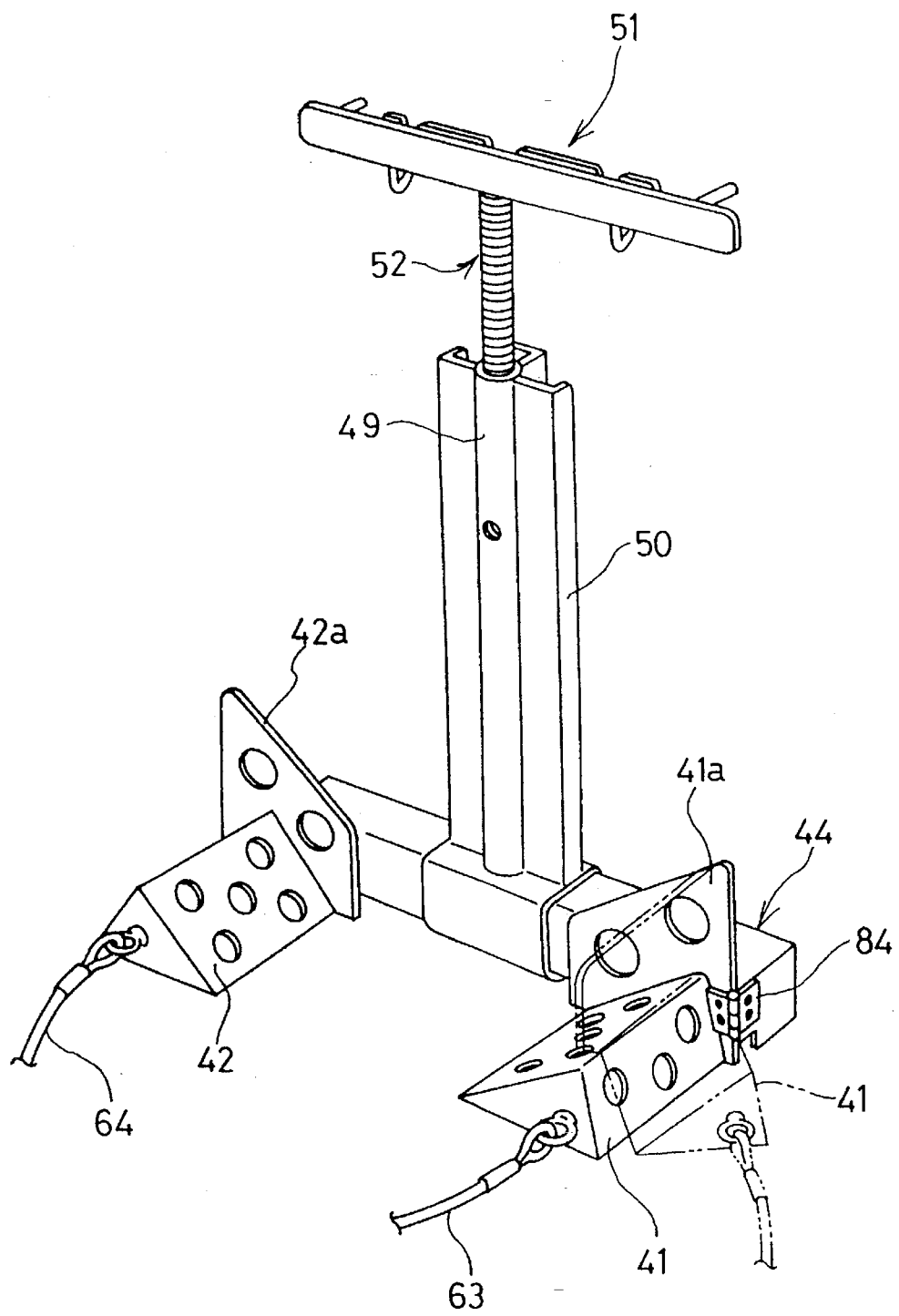
FIG. 18 is an overall perspective view of the vehicle detention device according to the third embodiment of the invention.

Next, referring to FIG. 18, the novel vehicle detention device according to the third embodiment of the invention is described below. In contrast with the second embodiment in which the stopper blocks 41 and 42 are secured to the cylindrical body 44 and the slidable shaft 45 respectively, according to the third embodiment, the stopper block 41 is secured to the square-cylindrical body 44 via a hinge 84 so that the stopper block 41 can freely swing about a vertical shaft. Except for this structural difference, other structural arrangements are identical to those of the second embodiment.

According to the third embodiment, in order to release the detained wheel, initially, the wheel 43 is released from the wires 63 and 64 in cooperation with the chains 65 and 66. Next, the stopper block 41 is externally rotated on the vertical shaft to facilitate removal of the vehicle detention device from the wheel 43. Even when releasing the tire 43a tightly bound by the stopper blocks 41 and 42, by effectively turning the stopper block 41, the vehicle detention device can readily be disengaged from the wheel 43.

Figure 19:
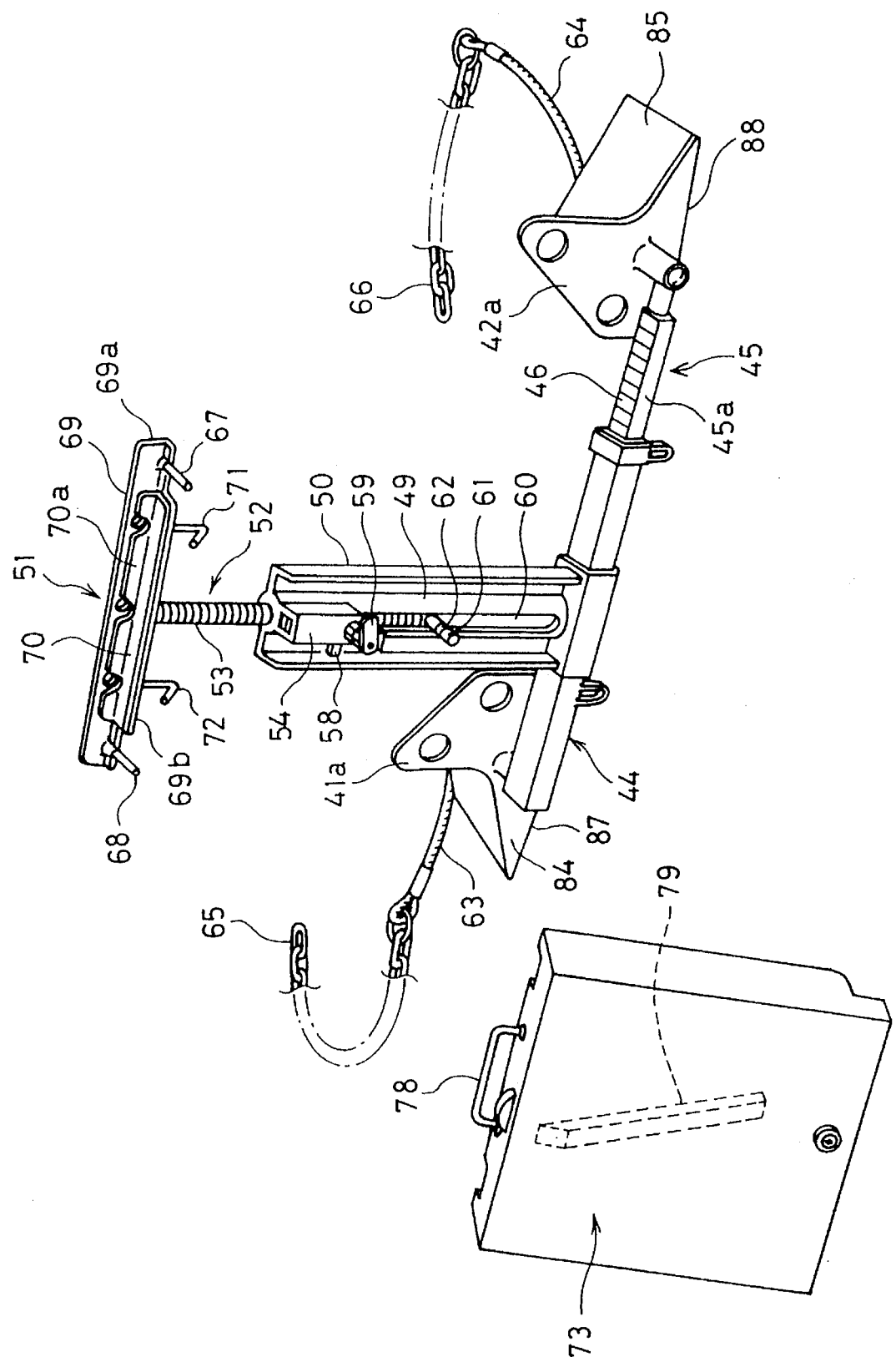
FIG. 19 is an overall perspective view of the vehicle detention device according to the fourth embodiment of the invention.
Figure 20:
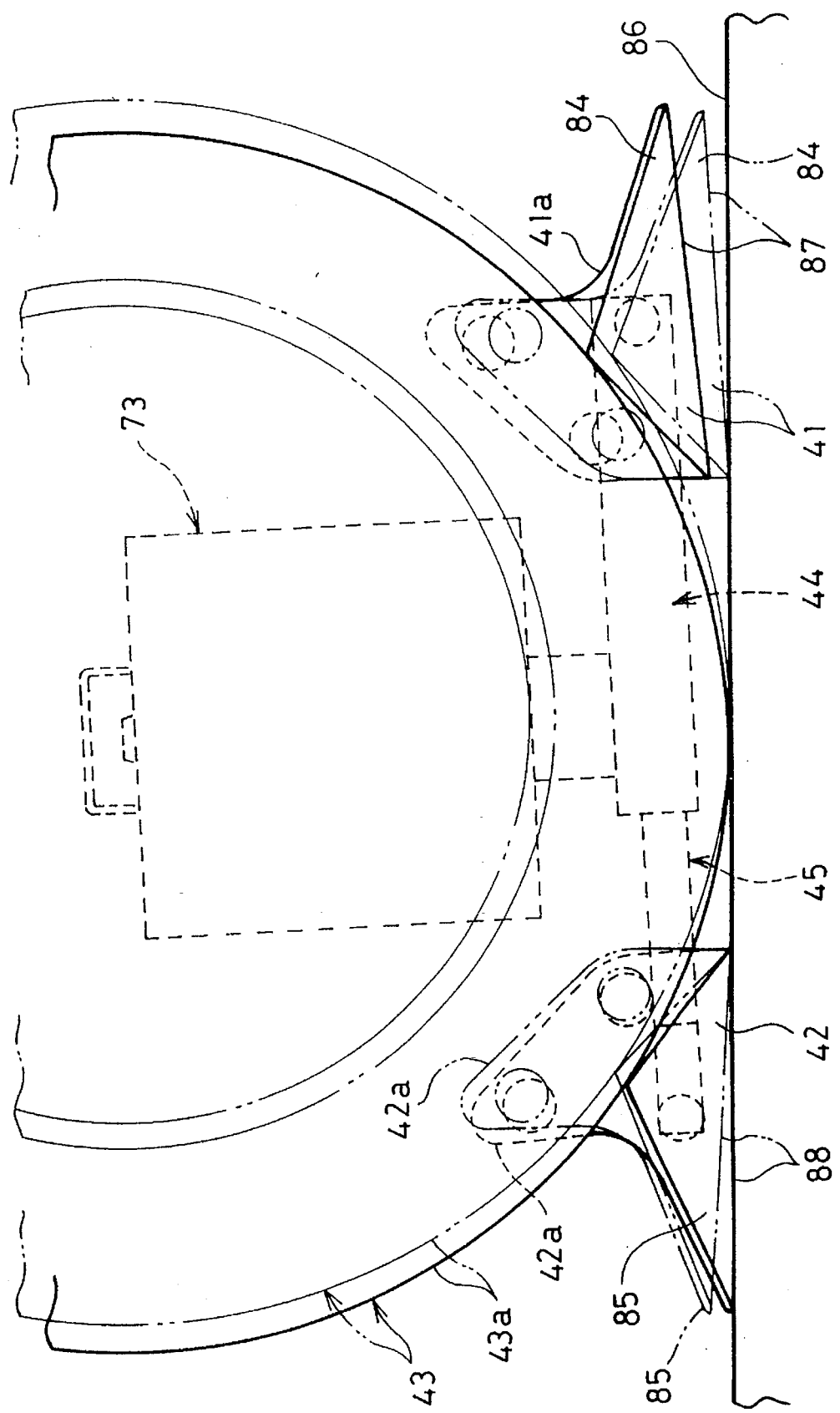
FIG. 20 is an enlarged view showing the relationship between stopper blocks of the invention and a wheel.

Next, referring to FIGS. 19 and 20, the vehicle detention device according to the fourth embodiment of the invention is described below. The fourth embodiment provides a pair of externally extended tapered members 84 and 85 being integrated with the stopper blocks 41 and 42, which are the same as in the second embodiment. In order that a clearance can be formed between tip ends of the externally extended tapered members 84 and 85 and the road surface 86 when the wheel 43 is secured, a pair of inclined surfaces 87 and 88 are provided on the bottom surfaces of the stopper block 41, the externally extended tapered member 84, the other stopper block 42, and the other externally extended tapered member 85. Except for the provision of the externally extended tapered members 84 and 85 and the inclined surfaces 87 and 88, other mechanical arrangements are identical to those of the second embodiment.

The vehicle detention device according to the invention characterized by the above structural arrangements is secured to a front wheel 43 of a vehicle driven by geared rear wheels, for example. When the engine of a vehicle held under detention is started, load from the front wheel 43 acts upon the stopper block 41 or the other stopper block 42 in the direction of the movement of the vehicle. More particularly, by effect of the shift of the center of gravity of the front wheel 43 to the stopper block 41 or the other stopper block 42 in the direction of the movement of the vehicle, load acts upon the stopper block 41 or the other stopper block 42 in the direction of the movement of the vehicle. As a result, the vehicle detention device inclines itself such that the inclined surface 87 or 88 remains in contact with road surface 86. FIG. 20 illustrates the state in which the stopper block 42 receives load from the front wheel 43. This in turn causes the vehicle detention device to incline and to generate close contact between the stopper block 42 and the externally extended tapered member 85 integrated therewith and road surface 86 by fully eliminating the clearance therebetween. While this condition is present, the front wheel 43 and the vehicle detention device secured to the front wheel 43 slide on road surface 86. Therefore, even when the vehicle is driven, the vehicle detention device does not rotate at all, thus preventing the driven vehicle from incurring unwanted damage.

What is claimed is:

1. A vehicle detention device for preventing a vehicle with a wheel and tire mounted on said wheel from moving, comprising:

a guide shaft;

a first stopper block secured to said guide shaft;

a second stopper block movable on said guide shaft toward and away from said first stopper block;

a locking means for engaging said second stopper block to prevent its movement away from said first stopper block thereby maintaining contact of both said stopper blocks with said tire at both sides of a ground contact point to prevent rotation of said wheel;

a pair of chains, each chain of said pair being secured to one of said stopper blocks;

a key-actuated cover for concealing said stopper blocks and said chains;

a strut movable on said guide shaft;

an elevating body including a shaft member received in said strut; and a plurality of hooks on a top end of said elevating body for hanging said pair of chains.

2. A vehicle detention device for preventing a vehicle with a wheel and tire mounted on said wheel from moving, comprising: a guide shaft;

a first stopper block secured to said guide shaft;

a second stopper block movable on said guide shaft toward and away from said first stopper block;

a locking means for engaging said second stopper block to prevent its movement away from said first stopper block thereby maintaining contact of both said stopper blocks with said tire at both sides of a ground contact point to prevent rotation of said wheel;

a pair of chains, each chain of said pair being secured to one of said stopper blocks;

a cover for concealing said stopper blocks and said chains;

a strut movable on said guide shaft;

an elevating body including a shaft member received in said strut;

said shaft member including an engaging shaft and said engaging shaft including an engaging groove;

said cover including a top end for engaging a top end of said elevating body and said cover further including a key-actuated rotary hook for engaging said engaging groove.

3. A device as in claims 1 or 2 wherein each of said stopper blocks includes a plate member for contact with an external surface of said tire.

4. A device as in claims 1 or 2 wherein said guide shaft includes a section having multi-step teeth formed on a surface of said section;

a casing for enveloping a portion of said guide shaft section, said casing being coupled to said second stopper block;

and wherein said locking means includes a locking claw on an inside of said casing and whereby said locking claw climbs over said multi-step teeth when said second stopper block moves on said guide shaft toward said first stopper block and said locking claw comes into engagement with said multi-step teeth when said second stopper block moves on said guide shaft away from said first stopper block.

5. A device as in claim 4 further including an unlocking preventive member on the inside of said casing to prevent insertion of an unlocking device through a clearance between said casing and said guide shaft section.

6. A device as in claims 1 or 2 wherein said shaft member includes multi-step teeth formed at equal pitches;

a casing secured to a top end of said strut;

a locking claw on an inside surface of said casing for engaging said multi-step teeth and maintaining said elevating body at a selected height.

7. A device as in claim 6 further including a fastening member having a tip passing into said casing for engagement with said locking claw to bias said locking claw into engagement with said multi-step teeth.

* * * * *